Jan. 10, 1939.   F. A. SCHMIDT   2,143,283
PROCESS FOR PRODUCTION OF SOLIDIFIED CARBON
DIOXIDE AND THE RECOVERY OF NITROGEN
Filed Dec. 2, 1935   2 Sheets-Sheet 1

INVENTOR
F. A. Schmidt
BY
ATTORNEY

Jan. 10, 1939.  F. A. SCHMIDT  2,143,283
PROCESS FOR PRODUCTION OF SOLIDIFIED CARBON
DIOXIDE AND THE RECOVERY OF NITROGEN
Filed Dec. 2, 1935  2 Sheets-Sheet 2
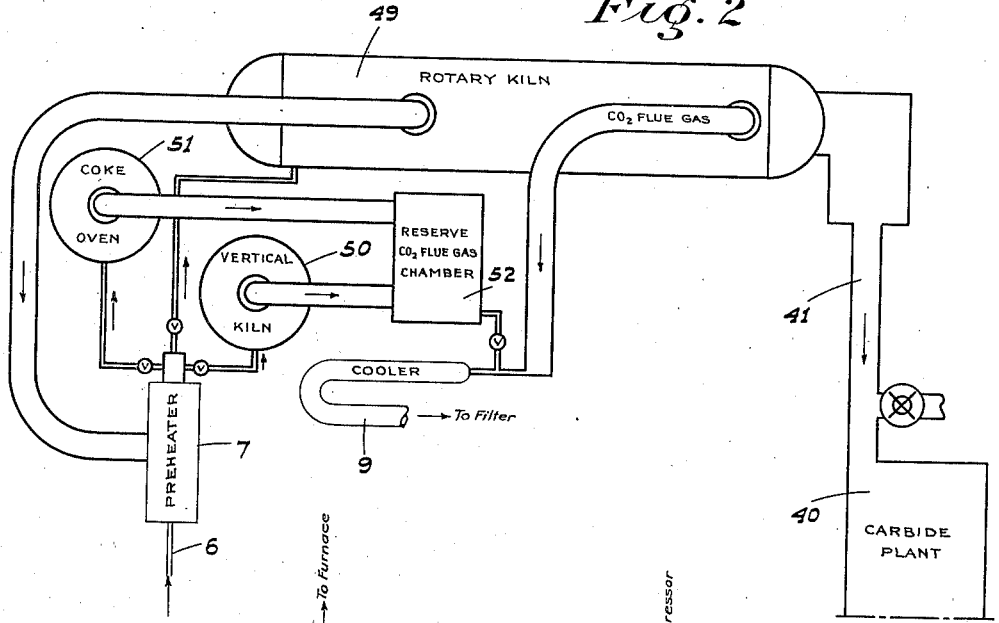
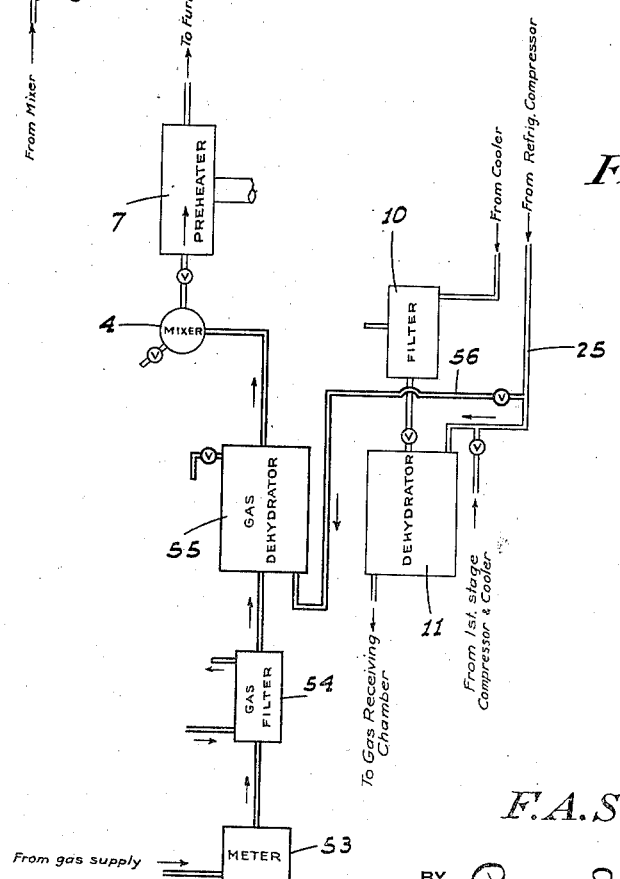
INVENTOR
F. A. Schmidt
BY
ATTORNEY Patented Jan. 10, 1939

2,143,283

UNITED STATES PATENT OFFICE 2,143,283

PROCESS FOR PRODUCTION OF SOLIDIFIED CARBON DIOXIDE AND THE RECOVERY OF NITROGEN

Fred A. Schmidt, South Gate, Calif.

Application December 2, 1935, Serial No. 52,519

5 Claims. (Cl. 62—175.5)

This invention relates to a process for the production, recovery and utilization of carbon dioxide and nitrogen.

One of the objects of this invention is to provide a process for producing gases of combustion having a high carbon dioxide and nitrogen content.

An additional object of the invention is to provide a process to separate the carbon dioxide and nitrogen from the gases of combustion, to solidify the carbon dioxide into dry ice and to recover the nitrogen for subsequent utilization.

An additional object of this invention is to provide a continuous process whereby lime, and flue gases containing carbon dioxide and nitrogen in large quantities, are produced by burning limestone and hydro-carbon fuels; and whereby the carbon dioxide and nitrogen are separately recovered from the flue gases and dry ice formed from the carbon dioxide, while the nitrogen is used in a fixation plant and in particular to produce cyanamide from carbide produced from the utilization of the lime.

These objects I accomplish by means of such equipment as will fully appear by perusal of the following specification.

In the drawings similar characters of reference indicate corresponding parts in the several views:

Figure 2 is a diagrammatic view of an additional portion of equipment employed when limestone and hydro-carbon fuel are the source of the carbon dioxide and nitrogen.

Figure 3 is a diagrammatic view of a substitute portion of the equipment employed when natural gas, or any other hydro-carbon gas, is the source of the carbon dioxide and nitrogen.

Figure 1:
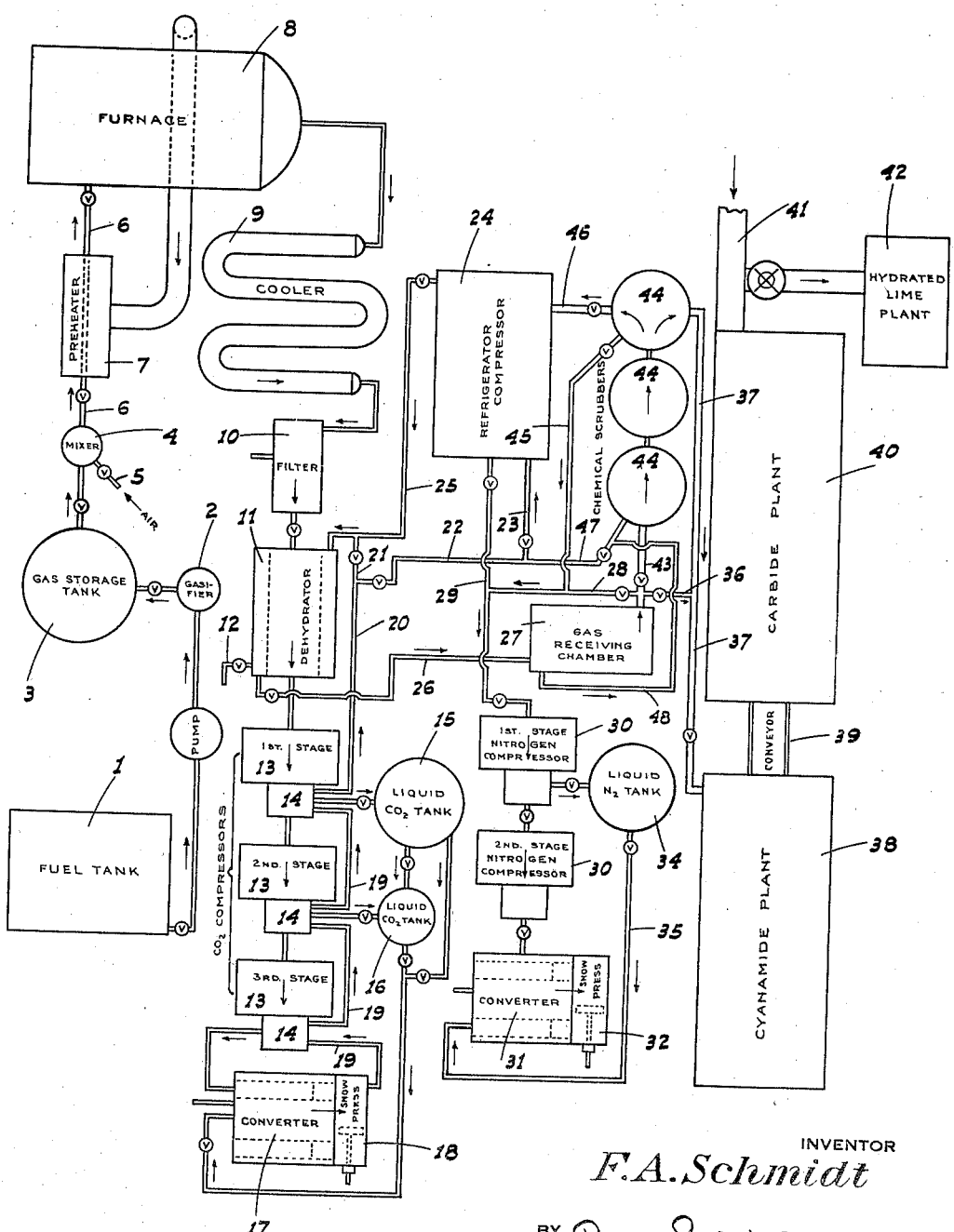
Figure 1 is a diagrammatic view of the equipment employed in carrying out my process when a liquid hydro-carbon fuel is the source of the carbon dioxide and nitrogen.

Referring now to the characters of reference on the drawings and in particular to the equipment illustrated in Figure 1, the process comprises the following steps:

Liquid hydro-carbon fuel stored in tank 1 is pumped to a gasifier 2 from which the gasified fuel passes to a storage tank 3. The gasified fuel then enters a mixer 4 where a predetermined proportion of air, which has been previously filtered and dehydrated, enters through pipe 5 and is mixed with the fuel and in such proportion as to promote complete combustion.

After the mixture is complete, it flows through pipe 6 where it is preheated at 7 to a degree slightly below the ignition point.

It then enters furnace 8 where combustion takes place creating flue gases containing, as usual, carbon dioxide, nitrogen, water vapor, sulphur compounds, etc. Flue gases from any source may also be employed in the process hereinafter described if such gases contain a sufficient percentage of carbon dioxide and nitrogen.

The flue gases are then cooled to approximately 200° Fahrenheit in a cooler 9 either by radiation or water jacketing. Leaving the cooler, the gases are passed through a filter 10 where all entrained solid matter is removed and the gases are then passed into an automatic defrosting dehydrator 11, or series of such dehydrators, where all the water vapor is condensed and drawn off, the gases being reduced in the dehydrator to a temperature of —20° to —50° Fahrenheit. The dehydrator also acts as a scrubber in that the water vapor, while condensing, unites with the sulphur compounds to form an acid which is drawn off with the water through valve 12.

The dehydrated and purified carbon dioxide and nitrogen gases then pass through three stages of compression, indicated generally at 13, where the pressure is increased to between 2500 and 4500 pounds per square inch and which pressure varies in accordance with the temperature and density of the mixture of gases. The gases at each stage of compression are subjected to a cooling action by a cooler 14. As the compression of the gases takes place at the first and second stages, a certain amount of carbon dioxide will be liquefied and will be drawn off into suitable storage tanks 15 and 16 where it may be held under pressure as a liquid. From the last stage of compression the remaining carbon dioxide and gaseous nitrogen enters a converter or expanding chamber 17 where approximately 90% of the carbon dioxide is recovered as a snow, which is then compressed in a snow press 18 into blocks of solidified carbon dioxide, commonly known as dry ice. The liquid carbon dioxide from tanks 15 and 16 may also be passed to the converter or may be withdrawn for other uses.

With the compressing of the snow into blocks, the nitrogen is released and recovered at a temperature of approximately —180° Fahrenheit. This nitrogen is then passed, by means of pipes 19, through the coolers 14 of the different stages of compression and acts as the cooling medium therefor. The nitrogen leaves the cooler of the first stage compressor in pipe 20 and, if still at a low enough temperature, is carried through pipe 21 into the dehydrator 11 where it acts as the refrigerant. If the temperature is not low enough for this purpose, it is passed through pipes 22 and 23 into a refrigerator compressor 24 and after its temperature is reduced it enters pipe 25 leading to dehydrator 11 to be used as the refrigerant therein.

After leaving the dehydrator 11, the nitrogen is conducted through pipe 26 into a gas receiving chamber 27. The nitrogen which has been recovered from the snow press and used as a cooling medium in the compressors and dehydrator is not entirely pure and contains a small percentage of carbon dioxide. Initial purification of the nitrogen occurs in the gas receiving chamber 27 and is accomplished by stratification and decanting, and the nitrogen being of less density than the carbon dioxide will rise to the upper portion of the chamber and may be drawn off. This stratification is expedited by the use of refrigeration.

From chamber 27 the nitrogen may be allowed to flow through pipe 28 into pipe 29 into nitrogen compressors 30 where it is liquefied and then expanded into snow in a converter 31 and compressed into blocks of nitrogen ice in a snow press 32. Any nitrogen which liquefies after the first stage of compression is drawn off into a storage tank 34 and may pass through pipe 35 into the converter 31. Nitrogen from the refrigerator compressor 24 may also be carried through pipe 29 into the compressors 30 and be used to form nitrogen ice.

Pure nitrogen drawn off from the upper strata in chamber 27 may be conducted through pipe 36 into pipe 37 leading to a cyanamide plant 38 where nitrogen fixation occurs to produce cyanamide, the carbide for the cyanamide plant being supplied to the plant by a conveyor 39 leading out of a carbide plant 40. The lime used to produce the carbide is supplied by a conveyor 41 from any suitable source and any excess quantity of lime may be by-passed from the conveyor into a hydrated lime plant 42. The cyanamide plant, carbide plant and hydrated lime plants are of common construction and operation.

After the pure nitrogen is drawn off, intermediately stratified nitrogen containing a small percentage of carbon dioxide is passed through pipe 43 into a series of chemical scrubbers 44 for complete purification and is then released into pipe 37 from the last scrubber.

All carbon dioxide which settles with some nitrogen to the bottom of chamber 27 as a lower strata is drawn off into exhaust pipe 48 which leads to pipe 47 and is then passed into the scrubbers where all traces of the carbon dioxide are removed from the nitrogen.

A by-pass pipe 46 permits excess purified nitrogen to flow, if desired, from the last scrubber into a refrigerator compressor 24 to be used for the purposes hereinbefore described.

Also, excess purified nitrogen may be passed directly from the last scrubber to compressors 30 through pipes 45, 28 and 29.

In some instances it is desirable to conduct the nitrogen from the pipe 20 directly to the first scrubber 44 and to accomplish this, pipe 22 extends beyond the intersection with pipe 23, as pipe 47, which leads to the first scrubber.

In the equipment herein described, all pipes are of course suitably valved in order that the steps of the process may be controlled and carried out in the manner herein stated.

I have heretofore described the lime for the carbine plant as being supplied from any suitable source. However, to provide a continuous process, I may provide lime and flue gas in the following manner and with the aid of the equipment illustrated diagrammatically in Figure 2.

To accomplish this continuous process, the gaseous hydrocarbon fuel passes through pipe 6 and is preheated at 7. From the preheater, the fuel is used to create combustion in a rotary lime kiln 49, in a vertical lime kiln 50 and in a coke oven 51. The flue gas from the two kilns and the coke oven may then be passed to cooler 9 and the process continued beyond the cooler as heretofore described in connection with the equipment illustrated in Figure 1.

The main portion of the flue gas utilized will come from the rotary kiln, but due to the higher percentage of carbon dioxide in the flue gas from the vertical kiln, it will be used when necessary to maintain the desired percentage of carbon dioxide in the flue gas entering the cooler; a constant percentage of carbon dioxide being of vital importance in the proper operation of compressors. Additional flue gas is obtained from coke oven 51 and the flue gas from the vertical kiln 50 and coke oven 51 may be held in reserve in chamber 52 and allowed to pass into cooler 9 in the amount desired. Coke from the coke oven 51 as well as the lime from the kilns is used in the production of carbide in carbide plant 40. The main portion of lime used in carbide plant 40 is obtained from kiln 49 and carried to plant 40 on a conveyor 41 while any excess lime is hydrated in the hydrated lime plant. As heretofore indicated, the process from the step of cooling in cooler 9 and from the step of producing the carbide, is the same here as in the process described in connection with Figure 1.

From the foregoing description it will be apparent that a continuous process is provided from the initial step of burning limestone to the final step of forming dry ice from the separated carbon dioxide and cyanamide by fixation of the separated nitrogen and, of course, any excess nitrogen may be converted into nitrogen ice blocks for use as a refrigerant or may be stored as liquid nitrogen for other commercial uses.

Referring now to the equipment illustrated in Figure 3, the process is varied in the following manner when an initially gaseous fuel, such as natural gas, is used to create the combustion. The gaseous fuel passes through a meter 53 and is then filtered at 54 to remove any foreign solid matter. After filtering, the gaseous fuel is dehydrated at 55 in order to remove the water vapor and thereby permit more efficient combustion of the fuel. Nitrogen passing through pipe 56 from pipe 25 is used as the refrigerant in the dehydrator 55. From the dehydrator the gaseous fuel passes into mixer 4 and is mixed with filtered and dehydrated air. Then the mixture is preheated and passed to the combustion chamber of the furnace or kiln as the case may be, and the process then proceeds as previously described.

The heretofore described process provides a highly efficient means of producing liquid carbon dioxide, solidified carbon dioxide, liquid nitrogen, solidified nitrogen and many nitrogenous products, including cyanamide, at a very low cost by utilizing all the products and by-products of an industry, thus providing for a large production of useful products at a minimum of cost.

While this specification sets forth in detail the present and preferred application of the process, still in practice such deviations from such detail may be resorted to as do not form a departure from the spirit of the invention as defined by the appended claims.

Having thus described my invention, what I claim as new and useful and desire to secure by Letters Patent is:

1. A process for producing liquefied carbon dioxide from gases having a carbon dioxide content, comprising the steps of cooling the gases, dehydrating the gases, compressing and subsequently cooling the gases until a portion of the carbon dioxide contained therein is liquefied, separating the liquid carbon dioxide from the remaining gases, and compressing and subsequently cooling the remaining gases until the remainder of the carbon dioxide therein is liquefied.

2. A process for producing solidified carbon dioxide and gaseous nitrogen from gases having a carbon dioxide and nitrogen content, comprising the steps of cooling the gases, dehydrating the gases, compressing and subsequently cooling the gases until a portion of the carbon dioxide contained therein is liquefied, separating said portion of liquid carbon dioxide from the remaining gases, compressing and subsequently cooling the remaining gases until the remainder of the carbon dioxide therein is liquefied into another portion, reuniting said portions of liquid carbon dioxide, then expanding the reunited portions of liquid carbon dioxide into a snow and compressing the snow, whereby the nitrogen is released.

3. A process for producing solidified carbon dioxide and gaseous nitrogen comprising the steps of filtering and dehydrating a gaseous hydrocarbon fuel, filtering and dehydrating air, introducing the air into the fuel in a quantity to promote combustion, causing combustion of the mixture, cooling and filtering the resultant gases, compressing the resultant gases until the carbon dioxide therein is liquefied, expanding the liquid into a snow, recovering the gaseous nitrogen and employing the same in the steps of dehydrating the fuel and air, all as a continuous process.

4. A process for producing liquefied carbon dioxide from gases containing gaseous carbon dioxide including the steps of subjecting the gases to a plurality of stages of compression, cooling the gases after each compression, the compression and cooling at each stage being sufficient to liquefy a portion of the carbon dioxide, and withdrawing that portion of the carbon dioxide which liquefies after compression and cooling at each stage.

5. A process for producing liquefied nitrogen from gas including carbon dioxide and nitrogen, the nitrogen being present in the mixture in relatively high proportionate content, said process comprising the steps of removing a substantial portion of the carbon dioxide content by successive stages of compression, cooling and withdrawing the liquefied carbon dioxide after each stage of compression, and expanding the remaining mixture in an expansion chamber after the last stage of compression thereby removing substantially all remaining carbon dioxide content in the form of snow, recovering the gaseous nitrogen from the expansion chamber, purifying the recovered nitrogen to remove the last traces of carbon dioxide, and finally compressing said recovered and purified nitrogen until substantially all of the same is liquefied.

FRED A. SCHMIDT.